US012233458B2

(12) United States Patent
Kavas et al.

(10) Patent No.: US 12,233,458 B2
(45) Date of Patent: Feb. 25, 2025

(54) POWDER REMOVAL ASSEMBLIES AND METHODS OF REMOVING UNBOUND PARTICLES USING POWDER REMOVAL ASSEMBLIES

(71) Applicant: General Electric Company, Schenectady, NY (US)

(72) Inventors: Baris Kavas, Istanbul (TR); Yusuf Eren Ozturk, Istanbul (TR); Steven C. Woods, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/494,414

(22) Filed: Oct. 5, 2021

(65) Prior Publication Data

US 2023/0103709 A1 Apr. 6, 2023

(51) Int. Cl.
  *B22F 10/68* (2021.01)
  *B22F 3/24* (2006.01)
  *B22F 12/90* (2021.01)
  *B33Y 40/20* (2020.01)

(52) U.S. Cl.
  CPC .............. *B22F 10/68* (2021.01); *B22F 12/90* (2021.01); *B33Y 40/20* (2020.01); *B22F 2003/247* (2013.01)

(58) Field of Classification Search
  CPC .... B22F 10/68; B22F 12/90; B22F 2003/247; B33Y 40/20
  See application file for complete search history.

(56) References Cited

U.S. PATENT DOCUMENTS

| 7,887,316 B2 | 2/2011 | Cox |
| 8,260,447 B2 | 9/2012 | Mattes et al. |
| 10,661,341 B2 | 5/2020 | Romano et al. |
| 10,773,304 B2 | 9/2020 | Wiesner et al. |

(Continued)

FOREIGN PATENT DOCUMENTS

| DE | 20107262 U1 | 8/2001 |
| DE | 102019000043 A1 | 7/2020 |

(Continued)

OTHER PUBLICATIONS

Extended European Search Report for Application No. 22195126.2 dated Feb. 27, 2023 (9 pages).

(Continued)

*Primary Examiner* — Rebecca Janssen
(74) *Attorney, Agent, or Firm* — Dinsmore & Shohl LLP

(57) ABSTRACT

A powder removal assembly for removing powder from a part produced by additive manufacturing, including a process chamber including an outlet, a powder removal device coupled to the process chamber and configured to remove particles from the process chamber, a particle sensor coupled to the outlet, the particle sensor being configured to monitor an amount of particles passing through the outlet as a function of time, and a control system communicatively coupled to the particle sensor and the powder removal device. The control system is configured to automatically activate and deactivate the powder removal device in response to a change in a rate of the amount of particles passing through the outlet as a function of time, passing a threshold value.

7 Claims, 5 Drawing Sheets

(56) References Cited

U.S. PATENT DOCUMENTS

| | | | |
|---|---|---|---|
| 2002/0090410 A1* | 7/2002 | Tochimoto | B29C 64/357 |
| | | | 425/215 |
| 2017/0363377 A1* | 12/2017 | Phillips | B22F 10/68 |
| 2018/0009007 A1 | 1/2018 | Craft et al. | |
| 2018/0186082 A1* | 7/2018 | Randhawa | B22F 12/44 |
| 2019/0210107 A1 | 7/2019 | Palmer | |
| 2021/0046705 A1 | 2/2021 | Hutchinson et al. | |
| 2021/0146621 A1* | 5/2021 | Olausson | B24C 1/08 |
| 2022/0134666 A1 | 5/2022 | Olausson et al. | |

FOREIGN PATENT DOCUMENTS

| | | | | |
|---|---|---|---|---|
| EP | 3533538 A1 * | 9/2019 | | B08B 15/02 |
| GB | 2582269 A | 9/2020 | | |
| JP | 4745867 B2 | 8/2011 | | |
| WO | 2021061167 A1 | 4/2021 | | |
| WO | 2021154224 A1 | 8/2021 | | |

OTHER PUBLICATIONS

European Patent Office Action for Application No. 22195126.2 dated Mar. 21, 2024 (6 pages).

\* cited by examiner

Figure 1:
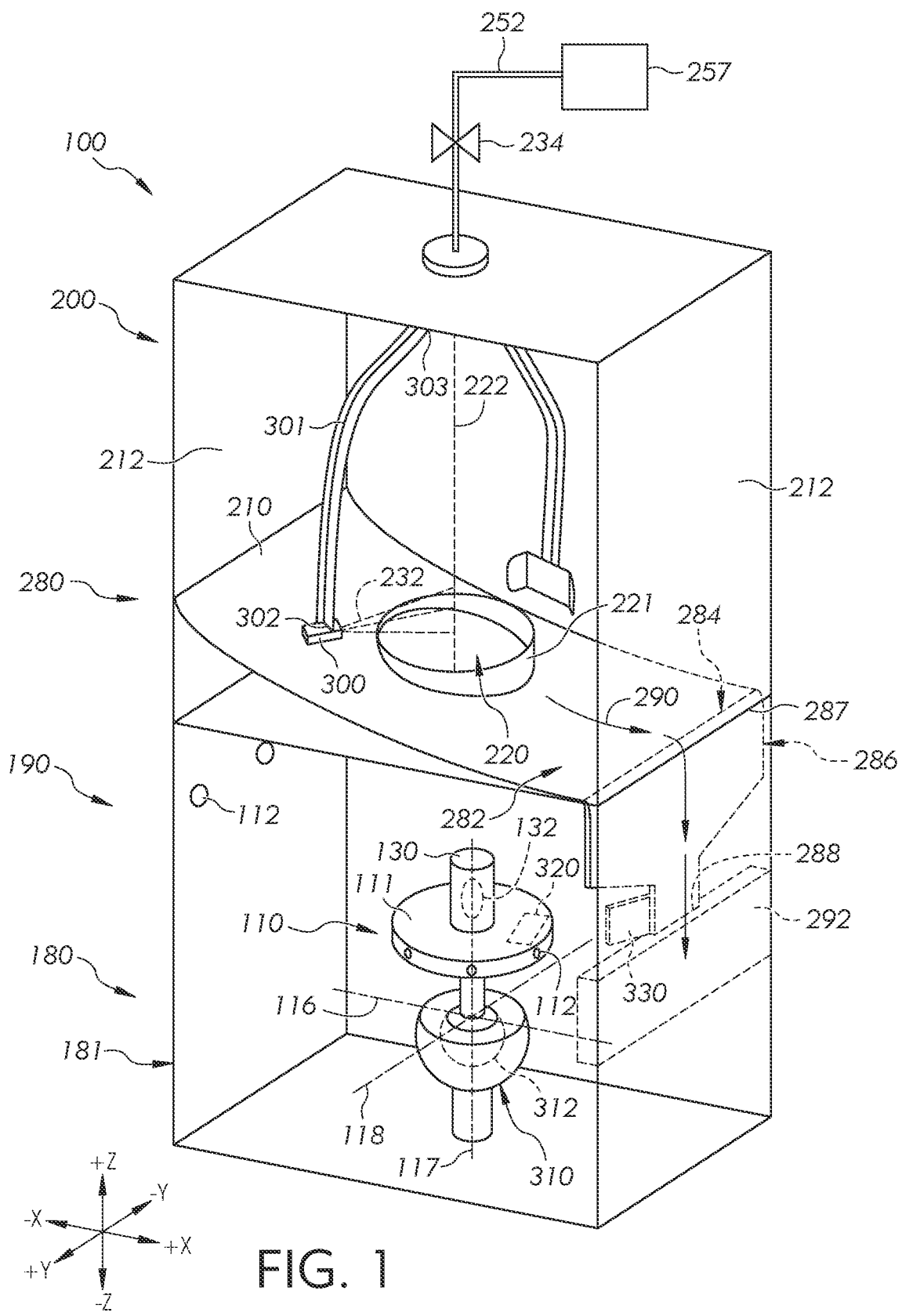

POWDER REMOVAL ASSEMBLIES AND METHODS OF REMOVING UNBOUND PARTICLES USING POWDER REMOVAL ASSEMBLIES

TECHNICAL FIELD

The present specification generally relates to additive manufacturing components, and more specifically, to powder removal sensing assemblies for additive manufacturing and methods for using the same.

BACKGROUND

Additive manufacturing may be utilized to build an object (e.g., a build part) from build material, such as organic or inorganic powders, in a layer-wise manner. Early iterations of additive manufacturing apparatuses were used for prototyping three-dimensional ("3D") objects. However, as additive manufacturing technology has improved, there is an increased interest in utilizing additive manufacturing for large-scale commercial production of objects.

The build part, when formed, may be disposed within a cake of excess build material that must be removed in order to complete the building process. The cake is conventionally removed in a process chamber that includes a plurality of powder removal devices for removing the excess build material surrounding the build part. However, conventional powder removal assemblies require an operator to observe the excess build material and control the function of powder removal devices, which can result in increased expense and downtime during manufacturing.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 schematically depicts an illustrative powder removal assembly including a process chamber for depowdering a cake, according to one or more aspects shown and described herein;

FIG. 2 schematically depicts a perspective view of the powder removal assembly of FIG. 1, according to one or more aspects shown and described herein;

FIG. 3 schematically depicts a top-down view of an illustrative process chamber for use with the powder removal assembly of FIG. 1, according to one or more aspects shown and described herein;

FIG. 4 schematically depicts a block diagram of an illustrative control system connected to a plurality of depowdering devices, according to one or more aspects shown and described herein;

FIG. 5 graphically depicts an illustrative powder parameter detected by a particle sensor, according to one or more aspects shown and described herein; and FIG. 6 depicts a flowchart generally describing an illustrative method for removing powder from a part, according to one or more aspects shown and described herein.

DETAILED DESCRIPTION

The various embodiments described relate to provide powder removal assemblies that include a powder removal device configured to remove particles from a process chamber, a particle sensor coupled to an outlet of a process chamber, and a control system that is coupled to the particle sensor and the powder removal device. The particle sensor is configured to monitor an amount of particles passing through the outlet as a function of time. The control system automatically activates and deactivates the powder removal device in response to a change in a rate of the amount of particles passing through the outlet as a function of time, passing a threshold value. For example, when the rate of particles passing through the outlet drops below a threshold value, the control system may deactivate the powder removal device to complete the powder removal process. Accordingly, various embodiments described herein automate the powder removal process based on a change in the rate of particles passing by a particle sensor positioned external to the process chamber. Such automation may increase the reliability and precision of the powder removal process, and may reduce the process time by enabling optimization of the powder removal process. These and other advantages will be described in greater detail below.

In additive manufacturing processes, the build part, when formed, may be disposed within a cake of excess build material that is removed in order to complete a building process. The cake is conventionally removed by a nozzle in a powder removal assembly, where the removed powder is monitored by an operator to determine when to stop the powder removal process. However, this process increases the amount of time required to fully process the build part, and depends on the subjective determination of the operator for the completion of the powder removal process.

Directional terms as used herein—for example, up, down, right, left, front, back, top, bottom, above, below—are made only with reference to the figures as drawn and are not intended to imply absolute orientation unless otherwise specified or apparent from the description.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and the number or type of embodiments described in the specification.

It is noted that the term "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Referring now to FIG. 1, an illustrative powder removal assembly 100 described herein may include a process chamber 200 and a build tank chamber 190. The process chamber 200 may be positioned above the build tank chamber 190 in an assembly vertical direction (e.g. in the +Z direction of the coordinate axes of FIG. 1). The process chamber 200 may include a bottom surface 210, a powder recovery outlet 284 defined by the bottom surface 210, a build inlet 220 defined by the bottom surface 210, and a pair of opposing side walls 212. The bottom surface 210 of the process chamber 200 may be arranged to promote the collection of a powder material. For example, in embodiments, the bottom surface 210 of the process chamber 200 may be downwardly sloped from an elevated side 280 to a recovery side 282 (e.g., sloping in the −Z direction of the coordinate axes of FIG. 1 when traversed in the +X direction of the coordinate axes of FIG. 1) such that powder material collects on the recovery side 282 of the bottom surface 210 due to gravity. The elevated side 280 of the bottom surface 210 may be coupled to one of the opposing side walls 212. The recovery side 282 of the bottom surface 210 may be coupled to a recovery chute 286, which will be described in greater detail below. The elevated side 280 may be coupled to the one of the opposing side walls 212 at a height in assembly vertical direction (e.g., in the +Z direction) greater than a height that the recovery side 282 is coupled to the other of the opposing side walls 212.

The build inlet 220 may extend through the bottom surface 210 to place the process chamber 200 in fluid communication with the build tank chamber 190. The build inlet 220 may be defined by a side wall 221 extending through the bottom surface 210 in the vertical direction (e.g., in the +Z/−Z directions) and may extend beyond the bottom surface 210 in some embodiments (e.g., extend in the +Z direction from the bottom surface 210). The build inlet 220 may include an inlet axis 222 which, in the embodiments described herein, may be substantially vertically oriented (e.g., in the +Z/−Z direction).

The powder recovery outlet 284 may extend through the bottom surface 210 and may be positioned on the recovery side 282 of the bottom surface 210 adjacent to one of the opposing side walls 212 such that powder material collected by the bottom surface 210 is directed to the powder recovery outlet 284. In addition, the powder recovery outlet 284 is configured to receive powder material. In embodiments, the powder removal assembly 100 may include a plurality of powder recovery outlets 284, where the collected powder material exits the process chamber 200 through the plurality of powder recovery outlets 284. In some embodiments, the powder recovery outlet 284 may be shaped as a slot. The powder recovery outlet 284 may extend in parallel with the one of the opposing side walls 212, and may extend the entire width of the bottom surface 210. In embodiments, the powder recovery outlet 284 may extend less than the entire width of the bottom surface 210. Specifically, the powder recovery outlet 284 may partially extend the width of the bottom surface 210, such as about 10% of the width of the bottom surface, about 20% of the width of the bottom surface, about 30% of the width of the bottom surface, about 40% of the width of the bottom surface, about 50% of the width of the bottom surface, or the like. However, the powder recovery outlet 284 may include any shape, such as a circular outlet, triangular outlet, a square-shaped outlet, or the like.

In embodiments, the powder recovery outlet 284 may be open to a powder recovery chamber 292 located outside the process chamber 200 (e.g., within a build tank 180 or the like). For example, as shown in FIG. 1, the powder recovery outlet 284 may be fluidly coupled to a powder recovery chamber 292 via a recovery chute 286. More particularly, the recovery chute 286 may have an outlet 288 fluidly coupled to the powder recovery chamber 292 and may have an inlet 287 configured to receive powder collected by the powder recovery outlet 284. In various embodiments, the powder recovery outlet 284 and the recovery chute 286 may define a flow path 290 between the process chamber 200 and the build tank chamber 190. In some embodiments, the recovery chute 286 may be tapered such that the inlet 287 is larger than the outlet 288. In various embodiments, the powder recovery chamber 292 may be positioned downstream of the powder recovery outlet 284 of the recovery chute 286. The powder recovery chamber 292 may be coupled to the outlet 288 of the recovery chute 286. The powder recovery chamber 292 may be in fluid communication with the recovery chute 286 and the powder recovery outlet 284 to collect powder material from the powder recovery outlet 284. The powder recovery chamber 292 may be configured to collect the powder material for reuse in additive manufacturing.

Figure 3:
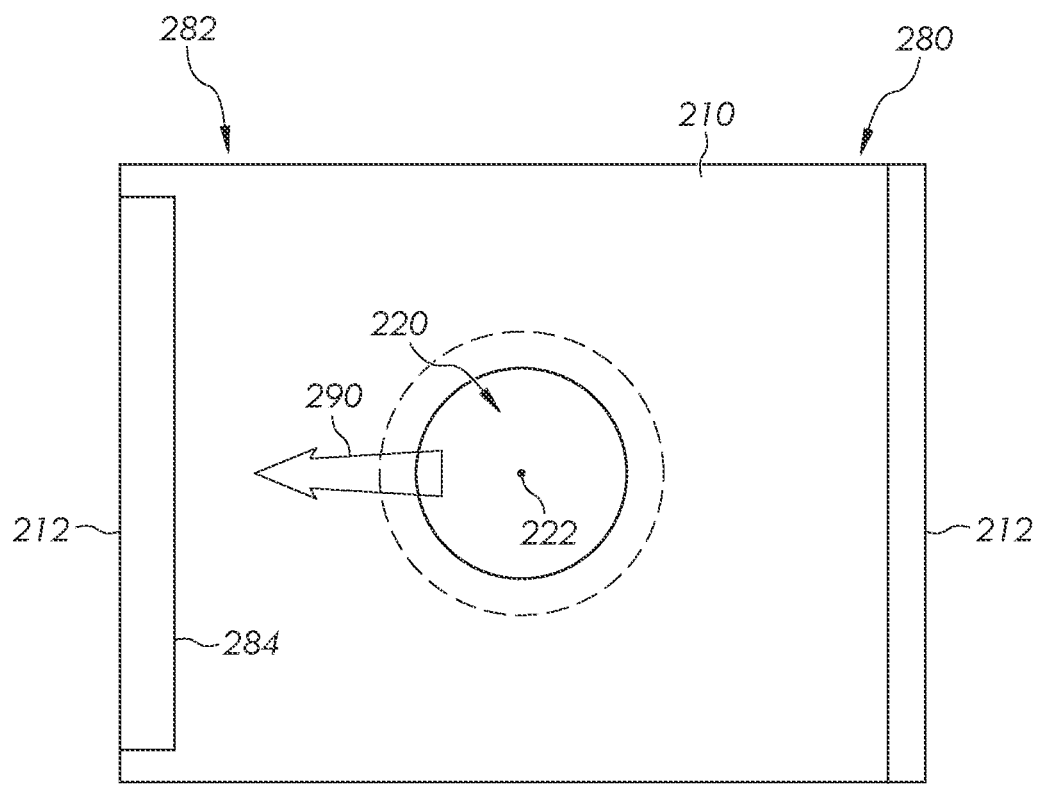
Figure 3:
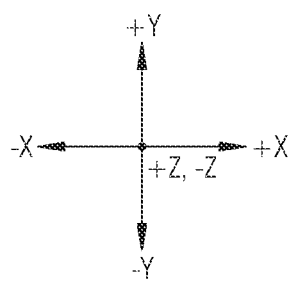

Referring briefly to FIG. 3, the flow path 290 is depicted along the bottom surface 210. The flow path 290 is defined by the slope of the bottom surface 210, where the flow path 290 extends from the elevated side 280 toward the recovery side 282. More specifically, the flow path 290 extends from the build inlet 220 to the powder recovery outlet 284. When powder material is removed from the cake, which will be described in greater detail below, powder material is forced by gravity along the flow path 290 into the powder recovery outlet 284.

Referring again to FIG. 1, the recovery chute 286 and the powder recovery chamber 292 may extend a distance between the opposing side walls 212, and in some embodiments, may span an entire distance between the opposing side walls 212. The recovery chute 286 and the powder recovery chamber 292 may be positioned below the powder recovery outlet 284 (e.g., in the −Z direction of the coordinate axes of FIG. 1) within the build tank chamber 190, such that the collected powder falls under force of gravity through the powder recovery outlet 284, the recovery chute 286, and into the powder recovery chamber 292.

Referring still to FIG. 1, the build tank chamber 190 may be configured to receive a build tank 180. The build tank 180 may include a housing 181, a platform 111, and a build elevator 110 coupled to the housing 181 and the platform 111. The build elevator 110 may be configured to raise and lower within the powder removal assembly 100. When the build tank 180 is situated in the build tank chamber 190, the housing 181 of the build tank 180 may be secured in place in the build tank chamber 190. The platform 111 may be engaged with the build elevator 110 such that the platform 111 may be raised with the build elevator 110 independent of the housing 181 of the build tank 180.

The build elevator 110 may be arranged below the build inlet 220 in the vertical direction (e.g., in the −Z direction). The build elevator 110 may be operable to selectively extend and retract through the build inlet 220 and into the process chamber 200 along the inlet axis 222. In embodiments, the build elevator 110 includes a telescoping actuator. The build elevator 110 may raise the platform 111 into the process chamber 200 through the build inlet 220. The platform 111 may be shaped similarly to the build inlet 220, such that the platform 111 and the side wall 221 of the build inlet 220 may provide a seal when the platform 111 is positioned within the build inlet 220, blocking off fluid communication between the process chamber 200 and the build tank chamber 190 through the build inlet 220. When the build inlet 220 is sealed by the platform 111 being positioned within the build inlet 220, the process chamber 200 and the build tank chamber 190 may be in fluid communication primarily through the powder recovery outlet 284. In embodiments, when the build inlet 220 is sealed by the platform 111 being positioned within the build inlet 220, the process chamber 200 and the build tank chamber 190 may be in fluid communication only through the powder recovery outlet 284.

The powder removal assembly 100 may include at least one elevator sensor 112. In some embodiments, the at least one elevator sensor 112 may be positioned on, at, or near the platform 111. The at least one elevator sensor 112 may detect a position of the build elevator 110 and platform 111. Specifically, the at least one elevator sensor 112 may detect whether the platform 111 is positioned in the build inlet 220 in the process chamber 200. In embodiments, the at least one elevator sensor 112 may be positioned on the housing 181 of the build tank 180. In these embodiments, the at least one elevator sensor 112 may be positioned at an upper portion of the housing 181 of the build tank 180 adjacent to the bottom surface 210 to detect when the platform 111 is raised past the at least one elevator sensor 112 into the process chamber 200. In some embodiments, the upper portion may be a portion of the housing 181 that is located above at least 50% of a height of the housing 181, such as above 60% of the height of the housing, above 70% of the height of the housing, above 80% of the height of the housing, above 90% of the height of the housing, or the like. The powder removal assembly 100 may include any number of elevator sensors 112, such as one, two, three, four, five, or the like. In some embodiments, the powder removal assembly 100 may include elevator sensors 112 positioned on both the platform 111 and the housing 181 of the build tank 180.

The at least one elevator sensor 112 may be a camera, Hall effect sensor, ultrasonic sensor, photoelectric sensor, or the like. For example, sensors such as a camera may capture image data relating to the environment and utilize software to compare the captured image data with reference data to determine the position of the platform 111 within the powder removal assembly 100. Sensors such as an ultrasonic sensor may use sound reflected off of nearby objects, which is then compared with reference data to detect a distance between the object and the sensor. The ultrasonic sensor may detect a change in the distance detected when the platform 111 passes the at least one elevator sensor 112. In embodiments where the at least one elevator sensor 112 is positioned on the platform 111, the ultrasonic sensor may detect the presence of the side wall 221 of the build inlet 220. In embodiments where the at least one elevator sensor 112 is positioned on the housing 181, the ultrasonic sensor may detect the presence of the platform 111 when the platform 111 is positioned near the upper portion of the housing 181. Sensors such as photoelectric sensors may emit a beam of light (e.g., a laser) from an emitter, which is sensed by a sensor. The location of the platform 111 may be determined when the beam of light sensed by the sensor is altered from a baseline. Sensors such as a Hall effect sensor may detect the presence and magnitude of a magnetic field to detect the position of an object. The Hall effect sensor may include the sensor coupled to one of the housing 181 of the build tank 180 and the platform 111, and a magnet coupled to the other of the housing 181 of the build tank 180 and the platform 111, such that the sensor may detect the position of the platform 111 based on the presence of a magnetic field. Other features and functionality of such sensors should be generally understood and are not discussed further herein.

A cake 130, including a build part 132, may be three-dimensionally printed, using methods such as additive manufacturing or the like, where powder is dispersed in layers and fused together. The cake 130 may include unbound particles, or powder material, attached to and surrounding the build part 132 that is separate from the build part 132, where it is desirable to remove the powder material from the build part 132. It should be appreciated that, depending on the particular build part 132, the additive manufacturing process may form cavities and channels within the cake 130. Initially, the cake 130 may be placed into the build tank chamber 190 on the platform 111. The build elevator 110 may raise the cake 130 into the process chamber 200 for depowdering of the cake 130. The cake 130 may be raised by raising the platform 111 into the process chamber 200 through the build inlet 220 along the inlet axis 222.

The powder removal assembly 100 may further include a rotation mechanism 310 coupled to the build elevator 110 and the platform 111, a vibration mechanism 320 coupled to the platform 111, and a nozzle 300. The rotation mechanism 310 and platform 111 may be rotatably coupled to the housing 181 within the build tank chamber 190. The rotation mechanism 310 may rotate the platform 111 to change the angular orientation of the platform 111. The rotation mechanism 310 may rotate the platform 111 between a first predetermined angular orientation and a second predetermined angular orientation. The first predetermined angular orientation may be 0°, where the platform 111 extends in parallel with a longitudinal plane (e.g., defined by the X and Y axes of the coordinate axes of FIG. 1). The second predetermined angular orientation may be any angle from at least one of a horizontal axis 116 (e.g., substantially parallel to the +X/−X axis of the coordinate axes of FIG. 1), a vertical axis 117 (e.g., substantially parallel to the +Z/−Z axis of the coordinate axes of FIG. 1) and a third axis 118 (e.g., substantially parallel to the +Y/−Y axis of the coordinate axes of FIG. 1). For example, the second predetermined angular orientation may be between about 5° and about 30°. In embodiments, the rotation mechanism 310 may rotate the platform 111 between a plurality of angular orientations. The rotation mechanism 310 may rotate about at least one axis. In embodiments, the rotation mechanism 310 may be rotatable about two axes. In embodiments, the rotation mechanism 310 may be rotatable about three axes.

The rotation mechanism 310 may rotate the platform 111 around the horizontal axis 116, the vertical axis 117, or the third axis 118. The rotation mechanism 310 may be coupled to the build tank chamber 190 via a joint 312. The joint 312 may enable the platform 111 and the rotation mechanism 310 to rotate about one, two, or three axes. The joint 312 may be a universal joint, a ball and socket joint, a knuckle joint, a pin joint, or any other joint now known or later developed.

The rotation mechanism 310 may be manually actuated, remotely actuated, or autonomously actuated. In embodiments, rotation mechanism 310 is manually actuated. The rotation mechanism 310 may be manually actuated via a hand-crank (not shown) connected to joint 312, or any other known mechanical device.

The vibration mechanism 320 may produce vibration and may transfer the vibration to the cake 130 through the platform 111 to loosen and remove the powder material surrounding the build part 132. The vibration mechanism 320 may produce vibration at one or more frequencies on a range between about 1 Hz and about 10 kHz, such as from about 40 Hz to about 70 Hz. The vibration mechanism 320 may include a vibratory motor, a mechanical actuator, a hydraulic actuator, a pneumatic actuator, an acoustic frequency generator, or any means for applying a vibratory frequency to the cake 130. The vibration mechanism 320 may be manually operable, remotely operable, or autonomously operable. In embodiments, the vibration mechanism 320 may provide different frequencies of vibration. An optimal frequency may be a frequency that causes the highest rate of material removal from the cake 130. The optimal frequency may depend on the geometry of the cake 130 and/or the build part 132. The vibration mechanism 320 may be modulating and configured to apply a vibration pattern of changing vibratory frequency and amplitude. In embodiments, the vibration mechanism 320 may apply a vibratory frequency directly to the platform 111 that is in contact with the cake 130. In embodiments, the vibration may be transferred directly to the cake 130.

In the embodiments described herein, the nozzle 300 may be oriented in the process chamber 200 to direct a stream of fluid 232 toward the inlet axis 222, thereby facilitating depowdering of the cake 130 as the cake 130 is introduced into the process chamber 200 along the inlet axis 222. The stream of fluid 232 may be a flow of fluid, such as liquid or gas.

Still referring to FIG. 1, the nozzle 300 may be positioned within the process chamber 200. The nozzle 300 may be fluidly coupled to a fluid source 257 via a fluid conduit 252. In some embodiments, a fluid control valve 234 may control movement of fluid between the fluid source 257 and the fluid conduit 252. The nozzle 300 may be rotatably coupled to one or more of the walls (e.g., the side walls 212, a front wall, a back wall, a ceiling) of the process chamber 200 by an arm 301. The arm 301 may include a first end 302 and a second end 303 opposite the first end 302 and spaced a distance from the first end 302. The nozzle 300 may be coupled to the first end 302 of the arm 301, and the one or more walls of the process chamber 200 may be coupled to the second end 303 of the arm 301. The second end 303 may be rotatably coupled to the one or more walls of the process chamber 200 at a position along the inlet axis 222. The arm 301 may be angled such that the first end 302 is spaced apart from the inlet axis 222, such that the arm 301 rotates the nozzle 300 about the inlet axis 222. It should be appreciated that such a coupling of the nozzle 300 via the arm 301 to one or more walls of the process chamber 200 as depicted in FIG. 1 is merely illustrative and other means of supporting the nozzle 300 within the process chamber 200 are contemplated and included within the scope of the present disclosure. In various other embodiments, the nozzle 300 may be directly coupled to a wall of the process chamber 200, may be mounted on a support within the process chamber 200, may be coupled to a track or the like that allows for movement of the nozzle 300 within the process chamber 200, and/or the like.

The fluid control valve 234 may be fluidly coupled between the fluid source 257 and the nozzle 300 such that the fluid control valve 234 can be controlled to maintain the flow of fluid between the fluid source 257 and the nozzle 300. For example, the fluid control valve 234 may be controlled to adjust one or more parameters of the stream of fluid 232 emitted from the nozzle 300, such as, for example, regulating a pressure of the stream of fluid 232 emitted from the nozzle 300, adjusting a distance that the stream of fluid 232 may travel, adjusting a direction of the stream of fluid 232 emitted from the nozzle 300, and/or the like. In embodiments, the fluid source 257 may be an air source, such as a compressed air source, which provides air to the nozzle 300 through the fluid conduit 252. The nozzle 300 may operate as an inlet for introducing the fluid into the process chamber 200. The fluid may be dispensed from the nozzle 300 in a direction generally toward the cake 130 when the platform 111 supporting the cake 130 is extended through the build inlet 220. Accordingly, the fluid dispensed from the nozzle 300 may dislodge particles from the cake 130 and pass into the powder recovery outlet 284 with the fluid as a powder effluent. The nozzle 300 may dispense a flow of fluid via the stream of fluid 232 to the cake 130 to remove powder material attached to the build part 132. The nozzle 300 may be particularly shaped to cause a particular spray pattern of fluid 232 to be ejected therefrom, such as, for example, a flat fan, a solid stream, a full cone, a hollow cone, mist, or the like. The particular shape of the nozzle 300 may also affect other characteristics of the stream of fluid 232, such as the velocity of the stream of the fluid 232 or the like. In embodiments, the nozzle 300 may be interchangeable, such that the spray pattern may be changed by replacing the nozzle 300 with a different nozzle to effect change of the spray pattern. In embodiments, the arm 301 may be a robotic manipulator with a tool changer. The tool changer is particularly configured to replace the interchangeable nozzle 300 with a different nozzle that causes the stream of fluid 232 to exhibit a different spray pattern. In some embodiments, the tool changer may be directed to change the nozzle 300 to effect change of the spray pattern based on the geometry of the build part 132 and cake 130. For example, a nozzle causing a flat fan spray pattern may be used to remove powder on an external surface of the cake 130. In another example, a nozzle causing a solid stream of relatively higher velocity fluid 232 may be used to remove powder from cavities and channels within the cake 130 and build part 132.

In embodiments, the nozzle 300 is configured to dispense the stream of fluid 232 at variable pressure. The pressure of the stream of fluid 232 may be adjusted in the range from about 3 to about 10 bar, from about 3 to about 8 bar, from about 3 to about 6 bar, from about 3 to about 4 bar, from about 4 to about 10 bar, from about 4 to about 8 bar, from about 4 to about 6 bar, from about 6 to about 10 bar, from about 6 to about 8 bar, or from about 8 to about 10 bar with the fluid control valve 234.

In embodiments, the nozzle 300 may be constructed of, for example and without limitation, a metal or a metallic alloy. However, it should be understood that other materials for the nozzle 300 are contemplated and possible, such as polymers, ceramics, and/or combinations thereof. In embodiments, the nozzle 300 may be constructed of a material similar to or the same as the build material to avoid contamination of the powder removed from the cake 130.

Referring still to FIG. 1, the powder removal assembly 100 may further include a particle sensor 330. The particle sensor 330 may be located adjacent to and/or coupled to the powder recovery outlet 284 and arranged such that the particle sensor 330 detects an amount of particles exiting the process chamber 200 through the powder recovery outlet 284, which includes particles of powder removed from the cake 130. Accordingly, as will be described in greater detail below, the particle sensor 330 can enable the depowdering process to be at least partially automated. For example, in various embodiments, the particle sensor 330 enables a transmission of one or more process parameters of the depowdering process to be automatically altered in response to a change in a rate of the amount of particles passing through the outlet as a function of time. In embodiments, the particle sensor 330 may be positioned external to the process chamber 200 and adjacent the powder recovery outlet 284. In embodiments, the particle sensor 330 may be directly adjacent the powder recovery outlet 284 such that there are no intervening valves, filters, or interruptions in the flow path 290 of the particles between the powder recovery outlet 284 and the particle sensor 330 so as to avoid false readings with regards to the amount of particles passing through the powder recovery outlet 284. In embodiments, the particle sensor 330 may be coupled to the recovery chute 286. Specifically, the particle sensor 330 may be coupled to the recovery chute 286 adjacent the outlet 288. The particle sensor 330 may be an optical particle sensor, a powder weight sensor, a light-scattering sensor, a light obstruction sensor, or the like. For example, sensors such as an optical particle sensor, a light-scattering sensor, and/or a light obstruction sensor may use a high-intensity light source directed at a flow of particles, and a photodetector that senses an amount of light passing through or scattered by the particles to detect a particle flow. Sensors such as a powder weight sensor may detect a load from the particles disposed on the sensor to determine an amount of particles (e.g., an amount of particles based on weight of the particles). Other features and functionality of such sensors should be generally understood and are not discussed further herein.

Figure 2:
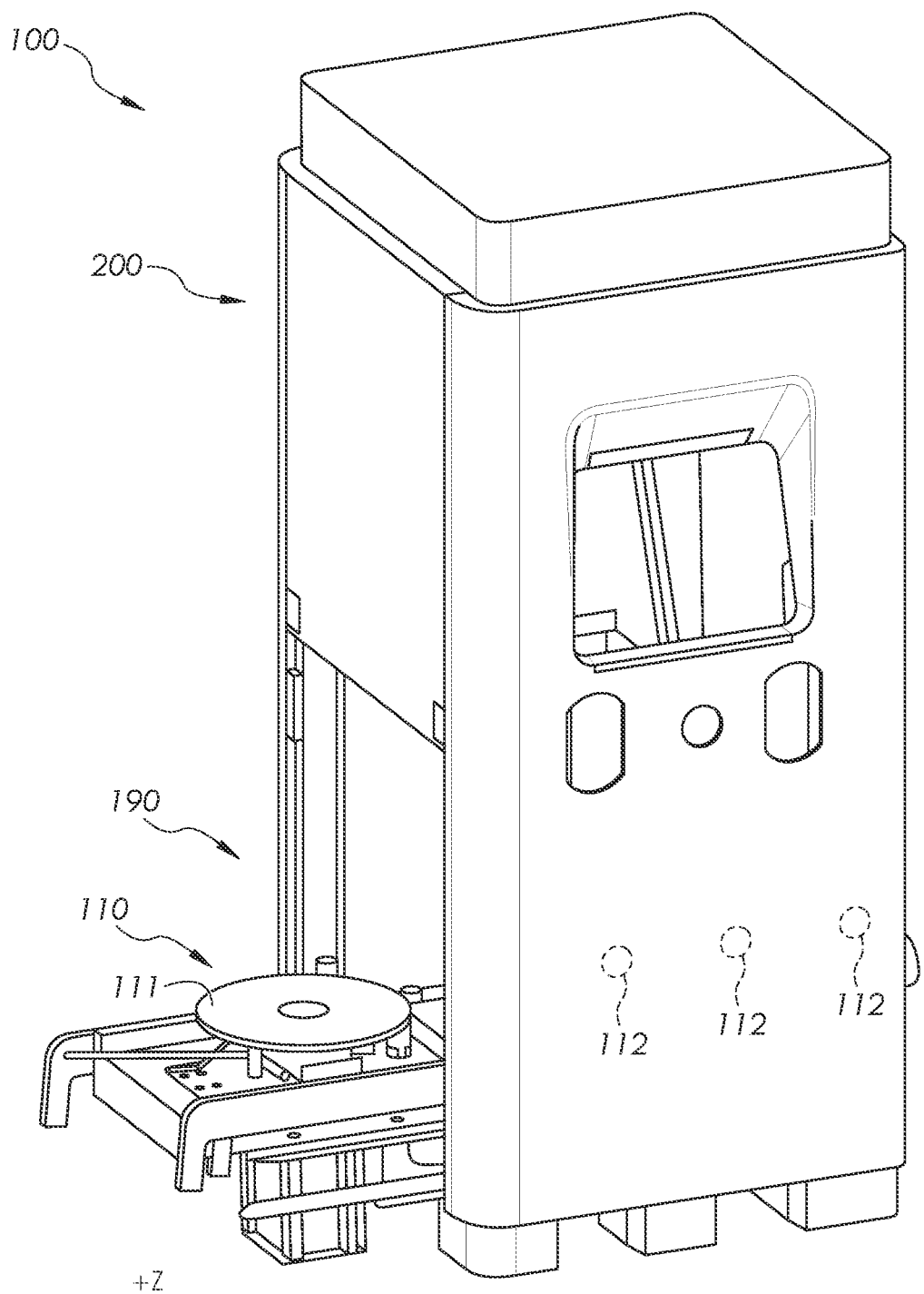

Referring also to FIG. 2, the build elevator 110 and platform 111 may be moveable in a lateral or longitudinal direction (e.g., in the +/−X or +/−Y direction). The build elevator 110 and platform 111 may be positioned outside of the build tank chamber 190 to allow the cake 130 to be placed on and fixed to the platform 111. When the cake 130 is placed on and fixed to the platform 111, the build elevator 110 and platform 111 may be moved in the lateral or longitudinal direction to be positioned within the build tank chamber 190. For example, the cake 130 may be placed on the platform 111 at a location outside the build tank chamber 190, moved in a first direction (e.g., in the −Y direction of the coordinate axes of FIGS. 1 and 2), and moved in a second direction (e.g., in the +Z direction of the coordinate axes of FIGS. 1 and 2). Once the cake 130 is positioned in the build tank chamber 190, a depowdering process may be initiated. When the depowdering process is completed, the build elevator 110 and platform 111 may be again moved outside of the build tank chamber 190 such that the build part 132 may be removed. For example, the platform 111 may be retracted (e.g., in the −Z direction of the coordinate axes of FIGS. 1 and 2) and then extended out of the build tank chamber 190 (e.g., in the +Y direction of the coordinate axes of FIGS. 1 and 2).

Figure 4:
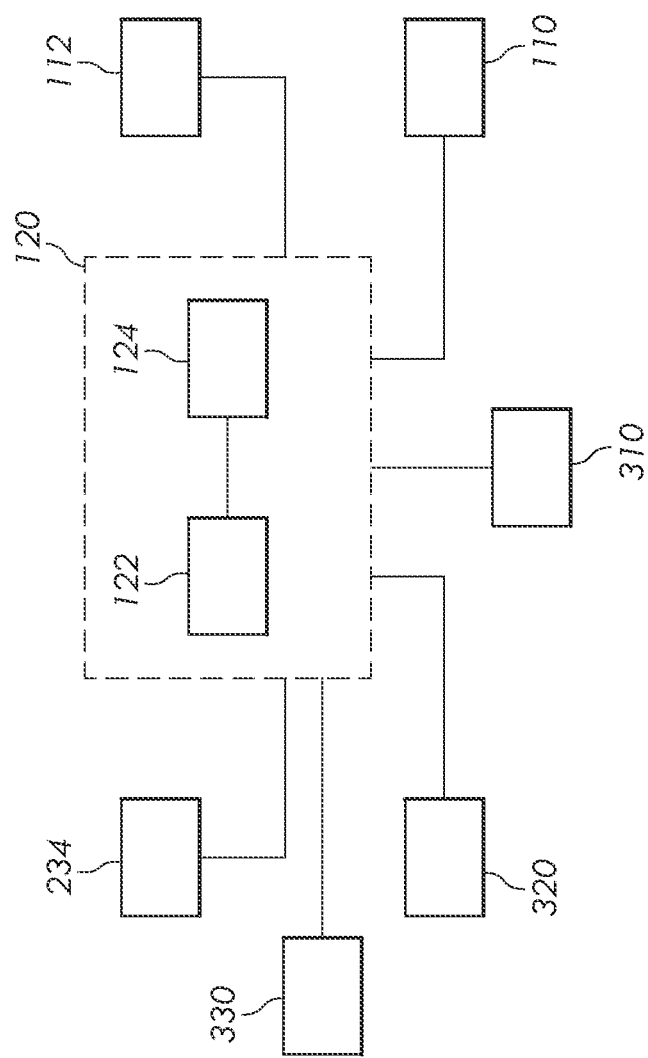

Referring now to FIG. 4, the powder removal assembly 100 may include a control system 120. The control system 120 may include a processor 122 communicatively coupled to a memory 124 (e.g., a non-transitory, processor readable storage medium or the like). The processor 122 may include any processing component(s), such as a central processing unit or the like, configured to receive and execute computer readable and executable instructions stored on, for example, the memory 124. The computer readable and executable instructions for controlling the powder removal assembly 100 may be stored on the memory 124 of the control system 120. The memory 124 may be configured as, for example and without limitation, volatile and/or nonvolatile memory and, as such, may include random access memory (including SRAM, DRAM, and/or other types of random access memory), flash memory, registers, compact discs (CD), digital versatile discs (DVD), and/or other types of storage components.

The processor 122 of the control system 120 may be communicatively coupled to the build elevator 110, the particle sensor 330, the vibration mechanism 320, the rotation mechanism 310, the nozzle 300 (via the fluid control valve 234), and/or the elevator sensors 112, as indicated by the lines extending from the control system 120 to the various components of FIG. 3. The control system 120 may be configured to transmit and/or receive signals to/from the build elevator 110, the particle sensor 330, the vibration mechanism 320, the rotation mechanism 310, the fluid control valve 234, and the elevator sensors 112 and, based on these signals, actuate the build elevator 110, the vibration mechanism 320, the rotation mechanism 310, and/or the fluid control valve 234.

For example, the control system 120 may receive signals from the particle sensor 330 corresponding to information regarding the powder parameter, monitors the powder parameter, and compares the powder parameter to a predetermined threshold value P. The control system 120 may continuously or periodically monitor the amount of particles detected by the particle sensor 330. In embodiments where the control system 120 periodically monitors the amount of particles detected by the particle sensor 330, the control system 120 may receive signals indicating the amount of particles on intervals of 1 second, 2 seconds, 3 seconds, 4 seconds, or the like.

The control system 120 may transmit at least one process parameter in response to the powder parameter passing the threshold value P. In various embodiments, the process parameter may include instructions for altering the orientation of the cake 130, a frequency of the vibration mechanism 320, the pressure of the stream of fluid 232 ejected from the nozzle 300, the orientation of the nozzle 300, the spray pattern of the stream of fluid 232 ejected from the nozzle 300, the distance of the stream of fluid 232 ejected from the nozzle 300, the velocity of the stream of fluid 232 ejected from the nozzle 300, or the like. In embodiments in which the powder parameter is the change of rate of an amount of particles, the threshold value P may be in the range of greater than 0 to about 15% of a peak rate of the amount of particles passing through the outlet as a function of time. Specifically, the peak rate may be the highest rate of the amount of particles passing through the outlet as a function of time. The control system 120 may reset the peak rate when the control system 120 transmits different process parameters, such that the change in the rate of the amount of particles passing through the outlet as a function of time is compared to the rate of the amount of particles during execution of the process parameters. In some embodiments, the threshold value P may be about 5% of the peak rate. In some embodiments, the threshold value P may be about 10% of the peak rate. The threshold value P of about 5% of the peak rate may include a deviation of about 0.5%. For example, about 5% of the peak rate may include values in the range between about 4.5% and about 5.5% of the peak rate. Similarly, the threshold value P of about 10% of the peak rate may include values in the range between about 9.5% and about 10.5% of the peak rate. In some embodiments, the control system 120 may determine that the threshold is exceeded when the detected value becomes less than or equal to the threshold. In some embodiments, the control system 120 may determine that the threshold is exceeded when the detected value becomes greater than the threshold.

Figure 5:
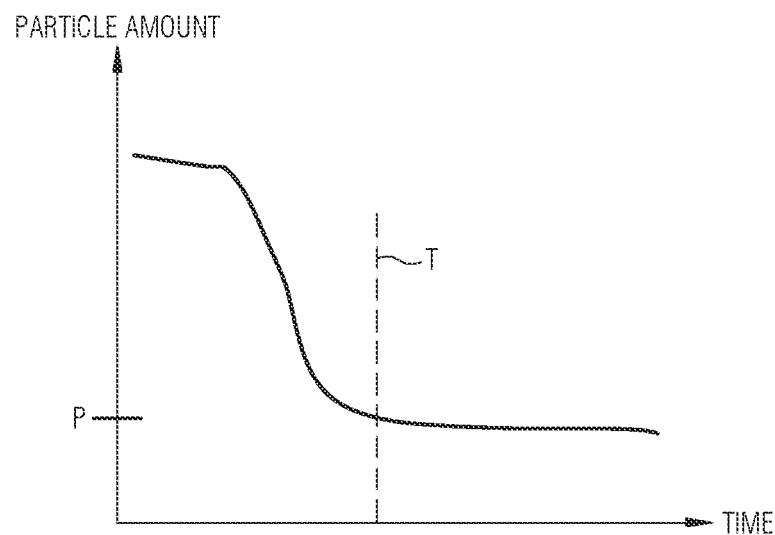

The control system 120 may monitor the rate of the amount of particles removed from the cake 130 (FIG. 1), where the control system 120 may deactivate transmission of or transmit additional process parameters at a time T, as shown graphically, for example, in FIG. 5. The time T may be when the rate of the amount of particles removed is below the threshold value. Referring also to FIG. 4, in embodiments, the computer readable and executable instructions, when executed by the processor 122, may transmit the at least one process parameter in coordination with the detected parameter compared to the threshold value P.

Figure 6:
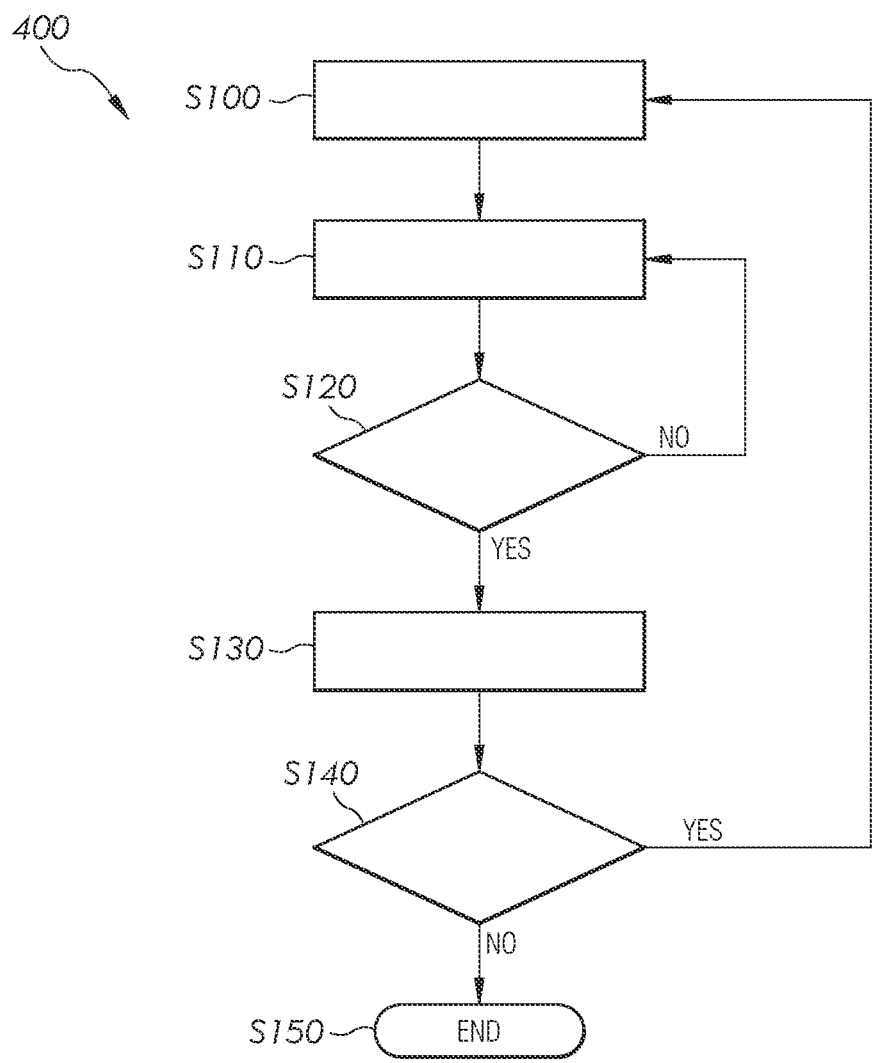

Referring now to FIG. 6, a flow chart depicting an illustrative method 400 of using the powder removal assembly 100 is described. It is noted that though a particular number of steps are depicted in a particular order, a greater of fewer number of steps may be included, in any order, without departing from the scope of the present disclosure. At step S100, the method 400 includes transmitting at least one process parameter. The process parameters may relate to one of the depowdering apparatuses, such as the vibration mechanism 320, the rotation mechanism 310, and/or the nozzle 300. At step S110, the method 400 includes monitoring an amount of particles removed from the cake 130 and/or build part 132. The particles may exit the process chamber 200 through the powder recovery outlet 284 and recovery chute 286, where the particles pass the particle sensor 330. At step S120, the method 400 includes determining whether the detected rate of particles exceeds the threshold value. If the detected rate of particles does not exceed the threshold value, the method 400 returns to step S110. If the detected rate of particles exceeds the threshold value, the method 400 continues to step S130. At step S130, the method 400 includes discontinuing a transmission of the process parameters once the detected rate of particles exceeds the threshold value. Transmission of the process parameters may be discontinued when the control system 120 determines that a sufficient amount of powder is removed from the cake 130. A sufficient amount of powder may be a predetermined amount that is calculated based on an approximate amount of powder used to form the cake 130. The method 400 may alternatively include transmitting additional process parameters once the detected rate of particles exceeds the threshold value. Additional process parameters may be transmitted if the control system 120 determines that a total amount of particles removed from the cake 130 is insufficient. At step S140, the method 400 includes determining whether further processing is necessary. If further processing is necessary, the method 400 may return to step S100. Further processing may be necessary if the cake 130 still has an amount of unbound particles that is above a predetermined threshold value. The predetermined threshold value may be about 1% of the amount of unbound particles on the cake 130 before processing, about 5% of the amount of unbound particles on the cake 130 before processing, about 10% of the amount of unbound particles on the cake 130 before processing, about 15% of the amount of unbound particles on the cake 130 before processing, or the like.

Additional details regarding operation of the powder removal assembly 100 as described with respect to FIG. 6 will now be described in further detail with reference to FIGS. 1-4.

The control system 120 may facilitate powder removal from the cake 130. The control system 120 may transmit process parameters for each of the fluid control valve 234, the vibration mechanism 320, and the rotation mechanism 310. For example, the control system 120 may transmit process parameters that are directed to a particular frequency of vibration from the vibration mechanism 320, the pressure of the stream of fluid 232 ejected from the nozzle 300, the orientation of the nozzle 300, the spray pattern of the stream of fluid 232 ejected from the nozzle 300, the distance of the stream of fluid 232 from the nozzle 300, the velocity of the stream of fluid 232 ejected from the nozzle 300, a particular angular orientation of the rotation mechanism 310, and/or the like that would result in removal of particles from the cake 130. For example, the control system 120 may transmit various process parameters that cause operation of the vibration mechanism 320 at about 40 Hz, operation of the fluid control valve 234 at about 8 bar, and/or operation of the rotation mechanism 310 at an angle of about 10° relative to the longitudinal plane (e.g., defined by the X and Y axes of the coordinate axes of FIG. 1). The control system 120 may transmit any combination of process parameters that are used to adjust the fluid control valve 234, the vibration mechanism 320, and/or the rotation mechanism 310 during processing. For example, the control system 120 may transmit process parameters such that only the fluid control valve 234 and the vibration mechanism 320 are operated. In this example, the rotation mechanism 310 may be inactive, where the platform 111 may be at an angle of 0°.

In embodiments, a computer-aided design (CAD) three-dimensional model of the geometry of the build part 132 (not shown) is uploaded to the control system 120 and the control system 120 determines parameters of the depowdering process based on the CAD model of the geometry of the build part 132 and the position of the build part 132 with respect to the build inlet 220.

That is, in embodiments, the computer readable and executable instructions, when executed by the processor 122, select the pressure of the stream of fluid 232 emitted by the nozzle 300 (not shown) via the fluid control valve 234 based on the geometry of the build part 132 (not shown) and the position of the build part 132 relative to the build inlet 220, select the orientation of the platform 111 (not shown) based on the geometry of the build part 132, select the vibration frequency based on the geometry of the build part 132, or combinations thereof. For example, if the build part 132 includes a plurality of channels extending therethrough, the computer readable and executable instructions may orient the build part 132 where one of the plurality of channels opens downwardly in the vertical direction (e.g., in the −Z direction of the coordinate axis in FIG. 1). In addition, the vibration frequency may be increased to shake loose unbound particles within the plurality of channels of the build part 132. Further, the pressure from the nozzle 300 may be increased and directed into the plurality of channels of the build part 132 to send a flow of fluid through the plurality of channels.

The powder removal procedure may include positioning the cake 130 on the platform 111. The control system 120 may actuate the build elevator 110, raising the platform 111 along the inlet axis 222, and through the build inlet 220 until the platform 111 is positioned in the process chamber 200, thereby positioning the cake 130 in the process chamber 200. The elevator sensors 112 may detect the positioning of the platform 111 in the process chamber 200 and may send a corresponding signal to the control system 120 to indicate when the platform 111 is appropriately located (e.g., at a particular height or the like). The control system 120 may stop the actuation of the build elevator 110 in response to the elevator sensor 112 signal.

In reference to step S100 of the method 400, once the cake 130 is positioned in the process chamber 200, the control system 120 may activate one of the depowdering devices and transmit a corresponding process parameter, such as a particular vibration frequency for the vibration mechanism 320 and may transmit accordingly. The cake 130 may be vibrated by the vibration mechanism 320. The vibrations loosen compacted powder to facilitate removal from the cavities and channels (not shown). The control system 120 may activate an additional depowdering device and transmit a corresponding process parameter, such as a particular angular orientation to be achieved by the rotation mechanism 310 and may transmit accordingly. The cake 130 may be rotated by the rotation mechanism 310 during vibration such that gravity draws the unfused powder toward one of the cavities and channels (not shown). For example, the cake 130 may be rotated such that the unfused powder follows the path of non-linear channels (not shown) within the cake 130. The control system 120 may further activate an additional depowdering device and transmit a corresponding process parameter, such as a particular pressure of fluid to be provided by the fluid control valve 234. Compressed fluid may be supplied at the pressure of the fluid by the nozzle 300 to remove the loosened powder. For example, compressed fluid may be supplied toward a channel (not shown) within the cake 130.

In reference to step S110, the control system 120 may continuously monitor an amount of particles removed from the cake 130 and/or build part 132. Such a continuous monitoring occurs when the particle sensor 330 monitors an amount of particles flowing through the powder recovery outlet 284, and may send a signal and/or data to the control system 120 that is indicative of the amount of particles flowing through the powder recovery outlet 284. In reference to step S120, the control system 120 may determine whether the particle amount exceeds a predetermined threshold value. In reference to step S130, when the threshold value is exceeded, the control system 120 may deactivate a transmission of the current process parameters. For example, the control system 120 may deactivate the vibration mechanism 320, stopping vibration of the cake 130. In reference to step S140, the control system 120 may then determine whether further processing is necessary, and may activate a transmission of further process parameters in response. Further processing may be necessary when the control system 120 determines an insufficient amount of powder has been removed from the cake 130. A sufficient amount of powder may be a predetermined amount relating to the amount of powder used to form the cake 130.

During operation of the depowdering devices, the unbound powder from the cake 130 is removed from the cake 130, and falls onto the bottom surface 210. The removed powder material may move along the flow path 290, where the powder material is pulled by gravity from the elevated side 280 toward the recovery side 282, and into the powder recovery outlet 284. The powder material may move through the powder recovery outlet 284, through the recovery chute 286, and into the powder recovery chamber 292, where the particle sensor 330 monitors the amount of powder passing through the recovery chute 286. The particle sensor 330 may send continuous signals to the control system 120 indicating the detected amount of powder. The control system 120 may compare the received signal to the threshold value P, and if the threshold value P is exceeded, the control system 120 may alter at least one process parameter. For example, the control system 120 may change the vibration frequency, the angular orientation, the pressure of the nozzle 300, or a combination thereof Alternatively, the control system 120 may determine that no further processing is necessary and deactivate a transmission of the process parameters. The control system 120 may determine that no further processing is necessary based on whether a sufficient amount of powder is removed from the cake 130. A sufficient amount of powder may be a predetermined amount that is calculated based on an approximate amount of powder used to form the cake 130. Additionally, the control system 120 may lower the platform 111 via the build elevator 110 out of the process chamber 200.

In the embodiments described herein, the plurality of depowdering apparatuses may be used in any conventional additive manufacturing assembly. Although the figures of the present disclosure may refer specifically to the powder removal assembly 100, it should be understood that the depowdering apparatuses may be used in any additive manufacturing assembly known in the art.

It should now be understood that powder removal assemblies may include a powder removal device that removes particles from a build part, a particle sensor that detects an amount of particles removed from the build part as a function of time, and a control system that is coupled to the particle sensor and the powder removal device that controls operation of the powder removal device according to an amount of particles detected by the particle sensor. For example, when a rate of particles detected by the particle sensor drops below a threshold value, the control system may deactivate the powder removal device. Accordingly, various embodiments described herein automate the powder removal process based on an amount of particles detected by the particle sensor. Such automation may increase the reliability and precision of the powder removal process, and may reduce the process time by enabling optimization of the powder removal process.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

Further aspects of the invention are provided by the subject matter of the following clauses:

A powder removal assembly for removing powder from a part produced by additive manufacturing, comprising: a process chamber including an outlet; a powder removal device coupled to the process chamber and configured to remove particles from the process chamber; a particle sensor coupled to the outlet, the particle sensor being configured to monitor an amount of particles passing through the outlet as a function of time; and a control system communicatively coupled to the particle sensor and the powder removal device, the control system being configured to automatically activate and deactivate the powder removal device in response to a change in a rate of the amount of particles passing through the outlet as a function of time, passing a threshold value.

The powder removal assembly of any preceding clause, wherein the powder removal device comprises a vibration mechanism configured to transfer vibration to the part.

The powder removal assembly of any preceding clause, wherein the powder removal device comprises a rotation mechanism configured to rotate the part.

The powder removal assembly of any preceding clause, wherein: the process chamber further comprises an inlet; and the powder removal device comprises a nozzle that ejects a fluid that passes into the process chamber through the inlet and out of the outlet.

The powder removal assembly of any preceding clause, further comprising: a plurality of powder removal devices, including a nozzle, a vibration mechanism, and a rotation mechanism, wherein: the powder removal device is one of the plurality of powder removal devices; the process chamber includes an inlet; the nozzle ejects a fluid that passes into the process chamber through the inlet and out of the outlet; and the control system is communicatively coupled to each of the plurality of powder removal devices, the control system being configured to activate and deactivate each of the plurality of powder removal devices in response to the change of the rate passing the threshold value.

The powder removal assembly of any preceding clause, wherein the particle sensor is positioned external to the process chamber and adjacent the outlet of the process chamber.

The powder removal assembly of any preceding clause, further comprising a recovery chute defining a flow path from the outlet of the process chamber to a powder recovery chamber, wherein the particle sensor is positioned along the flow path and adjacent the outlet of the process chamber.

The powder removal assembly of any preceding clause, wherein the particle sensor comprises one or more of an optical particle sensor, a powder weight sensor, a light-scattering sensor, and a light obstruction sensor.

The powder removal assembly of any preceding clause, wherein the threshold value is greater than 0% and less than or equal to about 5% of a peak rate of the amount of particles passing through the outlet as a function of time.

The powder removal assembly of any preceding clause, wherein the nozzle is removably coupled to the process chamber, the nozzle being configured to be interchangeable.

The powder removal assembly of any preceding clause, wherein the nozzle comprises a spray pattern of one or more of a flat fan, a solid stream, a full cone, a hollow cone, and mist.

The powder removal assembly of any preceding clause, wherein the powder removal device comprises a plurality of interchangeable nozzles, the plurality of interchangeable nozzles comprises sprays patterns of two or more of a flat fan, a solid stream, a full cone, a hollow cone, and mist.

The powder removal assembly of any preceding clause, further comprising a tool changer configured to remove and replace the interchangeable nozzle.

A method of removing unbound particles from a part produced by additive manufacturing, the method comprising: vibrating the part and the unbound particles within a process chamber to remove at least a portion of the unbound particles; removing the unbound particles from the process chamber through an outlet of the process chamber; monitoring an amount of particles passing through the outlet as a function of time using a particle sensor positioned external to the process chamber; and automatically transmitting at least one process parameter in response to a change in a rate of the amount of particles passing through the outlet as a function of time, passing a threshold value.

The method of any preceding clause, further comprising rotating the part to a first predetermined angular orientation.

The method of any preceding clause, wherein transmitting the at least one process parameter comprises instructions for rotating the part to a second predetermined angular orientation.

The method of any preceding clause, wherein transmitting the at least one process parameter comprises instructions for stopping vibration of the part when the change in the rate passes the threshold value.

The method of any preceding clause, wherein transmitting the at least one process parameter comprises instructions for changing a frequency of vibration.

The method of any preceding clause, further comprising vibrating the part and the unbound particles under a flow of fluid to remove at least a portion of the unbound particles with the flow of fluid, wherein transmitting the at least one process parameter comprises instructions for rotating a source providing the flow of fluid with respect to the part.

The method of any preceding clause, further comprising vibrating the part and the unbound particles under a flow of fluid to remove at least a portion of the unbound particles with the flow of fluid, wherein transmitting the at least one process parameter comprises instructions for changing at least one of a pressure and a spray pattern of the flow of fluid.

The method of any preceding clause, further comprising vibrating the part and the unbound particles under a flow of fluid to remove at least a portion of the unbound particles with the flow of fluid, wherein transmitting the at least one process parameter comprises instructions for stopping the flow of fluid.

The method of any preceding clause, wherein the threshold value is greater than 0% and less than or equal to about 5% a peak rate of the amount of particles passing through the outlet as a function of time.

The method of any preceding clause, wherein transmitting the at least one process parameter comprises transmitting the at least one process parameter when the change in the rate is less than the threshold value.

A powder removal assembly for removing powder from a part produced by additive manufacturing, comprising: a build tank chamber; a process chamber positioned adjacent the build tank chamber, wherein the process chamber includes an outlet; an elevator coupled to the build tank chamber, wherein the elevator selectively extends and retracts into and out of the process chamber; a powder removal device coupled to the process chamber and configured to remove particles from the process chamber; a particle sensor coupled to the outlet, the particle sensor configured to monitor an amount of particles passing through the outlet as a function of time; and a control system communicatively coupled to the particle sensor and the powder removal device, the control system being configured to automatically activate and deactivate the powder removal device in response to a change in a rate of the amount of particles passing through the outlet as a function of time, passing a threshold value.

What is claimed is:
1. A powder removal assembly for removing powder from a part produced by additive manufacturing, comprising:
   a process chamber including an outlet and an inlet defining an inlet axis;
   a recovery chute defining a flow path from the outlet of the process chamber to a powder recovery chamber;
   a nozzle rotatably coupled to the process chamber and configured to remove particles from the process chamber, the nozzle positioned to direct a fluid towards a cake including the part,
      the nozzle being oriented to direct the fluid towards the inlet axis and rotatable about the inlet axis;
   a particle sensor coupled to the outlet to determine an amount of particles falling under the force of gravity as a function of time, the particle sensor positioned along the flow path and adjacent to the outlet of the process chamber; and
   a control system communicatively coupled to the particle sensor and the nozzle, the control system being configured to automatically activate and deactivate the nozzle in response to a change in a rate of the amount of particles passing through the outlet as a function of time, passing a threshold value.
2. The powder removal assembly of claim 1, further comprising a vibration mechanism configured to transfer vibration to the part.

3. The powder removal assembly of claim 1, further comprising a rotation mechanism configured to rotate the part.

4. The powder removal assembly of claim 1, further comprising:
   a plurality of powder removal devices, including a vibration mechanism and a rotation mechanism, wherein:
      the control system is communicatively coupled to each of the plurality of powder removal devices, the control system being configured to activate and deactivate each of the plurality of powder removal devices in response to the change of the rate passing the threshold value.

5. The powder removal assembly of claim 1, wherein the particle sensor comprises one or more of an optical particle sensor, a powder weight sensor, a light-scattering sensor, and a light obstruction sensor.

6. The powder removal assembly of claim 1, wherein the threshold value is greater than 0% and less than or equal to about 5% of a peak rate of the amount of particles passing through the outlet as a function of time.

7. A powder removal assembly for removing powder from a part produced by additive manufacturing, comprising:
   a process chamber including an outlet;
   a recovery chute defining a flow path from the outlet of the process chamber to a powder recovery chamber;
   an elevator that selectively extends and retracts into and out of the process chamber through an inlet defining an inlet axis;
   a nozzle rotatably coupled to the process chamber and configured to remove particles from the process chamber, the nozzle being positioned to direct a fluid towards a cake including the part, the nozzle being rotatable about the inlet axis;
   a particle sensor coupled to the outlet to determine an amount of particles falling under the force of gravity as a function of time, the particle sensor positioned along the flow path and adjacent to the outlet of the process chamber; and
   a control system communicatively coupled to the particle sensor and the nozzle, the control system being configured to automatically activate and deactivate the nozzle in response to a change in a rate of the amount of particles passing through the outlet as a function of time, passing a threshold value.

\* \* \* \* \*